United States Patent
Antinori et al.

(10) Patent No.: US 11,567,739 B2
(45) Date of Patent: Jan. 31, 2023

(54) SIMPLIFYING CREATION AND PUBLISHING OF SCHEMAS WHILE BUILDING APPLICATIONS

(71) Applicant: Red Hat, Inc., Raleigh, NC (US)

(72) Inventors: Paolo Antinori, Milan (IT); Andrea Cosentino, Milan (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/231,773

(22) Filed: Apr. 15, 2021

(65) Prior Publication Data

US 2022/0334811 A1    Oct. 20, 2022

(51) Int. Cl.
*G06F 8/60* (2018.01)
*G06F 8/35* (2018.01)
*G06F 8/41* (2018.01)
*G06F 8/20* (2018.01)

(52) U.S. Cl.
CPC .......... *G06F 8/35* (2013.01); *G06F 8/24* (2013.01); *G06F 8/427* (2013.01); *G06F 8/433* (2013.01); *G06F 8/60* (2013.01)

(58) Field of Classification Search
CPC .......... G06F 8/24; G06F 8/35; G06F 8/60
See application file for complete search history.

(56) References Cited

U.S. PATENT DOCUMENTS

| | | | | |
|---|---|---|---|---|
| 8,209,660 B2 * | 6/2012 | Sundararajan | ............ | G06F 8/71 717/121 |
| 8,650,479 B2 | 2/2014 | Jardine-Skinner et al. | | |
| 9,563,486 B1 * | 2/2017 | Narsude | ................. | G06F 16/248 |
| 10,592,386 B2 | 3/2020 | Walters et al. | | |
| 10,620,924 B2 | 4/2020 | Stojanovic et al. | | |
| 2006/0064667 A1 * | 3/2006 | Freitas | ...................... | G06F 8/35 717/106 |
| 2011/0161922 A1 * | 6/2011 | Gerken | ...................... | G06F 8/35 717/106 |
| 2018/0165604 A1 | 6/2018 | Minkin et al. | | |
| 2018/0316735 A1 | 11/2018 | Yang et al. | | |
| 2020/0167153 A1 * | 5/2020 | Wang | ...................... | G06F 11/36 |

(Continued)

OTHER PUBLICATIONS

Cristian Ramon-Cortes et al., A Programming Model for Hybrid Workflows: combining Task-based Workflows and Dataflows all-in-one, arXiv.org, Jul. 10, 2020, pp. 1-50. Retrieved from the Internet: <URL: https://arxiv.org/pdf/2007.04939.pdf>. (Year: 2020).*

(Continued)

*Primary Examiner* — Hanh Thi-Minh Bui
(74) *Attorney, Agent, or Firm* — K&L Gates LLP

(57) ABSTRACT

A system includes a memory and a processor, where the processor is in communication with the memory. The processor is configured to receive a request to build an application, where the application is associated with source code. The source code is analyzed to detect whether a first interface is implemented within the application. The source code is parsed to determine an invocation of the first interface. Inputs and outputs (I/Os) from the first interface are determined based on the invocation of the first interface. A model is generated based on the I/Os associated with the first interface, where the model includes a structure of each of the I/Os. The model is published to a registry.

17 Claims, 4 Drawing Sheets

(56) References Cited

U.S. PATENT DOCUMENTS

2020/0257524 A1* 8/2020 Callahan ................ G06F 8/427

OTHER PUBLICATIONS

Lewis DeFelice, "A Brief Introduction to Schema Evolution in Kafka Schema Registry", https://www.instaclustr.com/kafka-schema-registry/; 12 pages; retreived on or before Feb. 9, 2021.
Jean-Paul Azar, "Kafka, Avro Serialization, and the Schema Registry", Big Data Zone Tutorial; https://dzone.com/articles/kafka-avro-serialization-and-the-schema-registry; Sep. 15, 2017; 20 pages; retreived on or before Feb. 9, 2021.

* cited by examiner

SIMPLIFYING CREATION AND PUBLISHING OF SCHEMAS WHILE BUILDING APPLICATIONS

BACKGROUND

Computer systems may run applications or services that are provided via a server or cloud. The applications or services can be developed and deployed at runtime. Application instances or services may run within containers, which may be run on physical or virtual machines. The containers may be used to separate various components of a computing system. For example, different components of a computing system may be executed at different containers and/or virtual machines executing on a computing device or multiple computing devices. Maintenance and/or modifications to installed service and/or applications may often be applied in various server or cloud environments which may be continuously evolving.

SUMMARY

The present disclosure provides new and innovative systems and methods for simplifying creation and publishing of schemas when building an application. In an example, a method includes receiving a request to build an application, where the application is associated with source code. The source code is analyzed to detect whether a first interface is implemented within the application. The source code is parsed to determine an invocation of the first interface. Next, the method includes determining inputs and outputs (I/Os) from the first interface based on the invocation of the first interface. A model is generated based on the I/Os associated with the first interface, where the model includes a structure of each of the I/Os. Next, the model is published to a registry.

In an example, a system includes a memory and a processor, where the processor is in communication with the memory. The processor is configured to receive a request to build an application, where the application is associated with source code. The source code is analyzed to detect whether a first interface is implemented within the application. The source code is parsed to determine an invocation of the first interface. Inputs and outputs (I/Os) from the first interface are determined based on the invocation of the first interface. A model is generated based on the I/Os associated with the first interface, where the model includes a structure of each of the I/Os. The model is published to a registry.

In an example, a non-transitory machine readable medium storing code, which when executed by a processor is configured to receive a request to build an application, where the application is associated with source code. The source code is analyzed to detect whether a first interface is implemented within the application. The source code is parsed to determine an invocation of the first interface. Inputs and outputs (I/Os) from the first interface are determined based on the invocation of the first interface. A model is generated based on the I/Os associated with the first interface, where the model includes a structure of each of the I/Os. The model is published to a registry Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Techniques are disclosed for providing an ability to simplify developing and/or building an application by integrating creation and publication of schemas from source code. Typically, an application implementing a variable interface (e.g., an interface associated with a Kafka topic) requires a schema or a reference to the schema that defines the variable interface. Conventionally, a schema provides a definition of a format of data being written and/or sent via the interface. Generally, creating and publishing a schema is a long and error prone process due to the schema potentially being complex and verbose. Often, errors generated associated with schema creation and/or publication affects an application and/or systems downtime.

As described in various examples disclosed herein, to facilitate development and/or building of an application, the systems and methods disclosed herein advantageously automatically generates and/or publishes schemas directly from source code of an application. In most implementations, generation and/or publication directly from source code reduces errors and ensures consistency during schema generation while also reducing downtime required to install and test the application. In certain implementations, schema generation and/or publishing directly from source code may increase efficiency and/or a memory footprint of the application and/or memory usage by other applications utilizing the schema.

In many implementations, a compiler may receive a request to build an application. In certain instances, building an application may include creating and/or publishing a schema associated with the application. In various implementations, a compiler may read and analyze source code associated with an application to detect whether an interface (e.g., a Kafka interface) is implemented within the application. In certain implementations, a compiler may parse source code to determine instances within the source code where an interface (e.g., a Kafka interface) is invoked. In various implementations, a compiler may analyze an invocation and/or profile of an interface to determine inputs and/or outputs (I/Os) from the interface and generate a model or schema based on the I/Os. In many instances, the compiler may publish the model or schema to a registry containing various models. In various instances, any device and/or application attempting to communicate with a device and/or application with a published schema may retrieve the schema from the registry.

Figure 1:
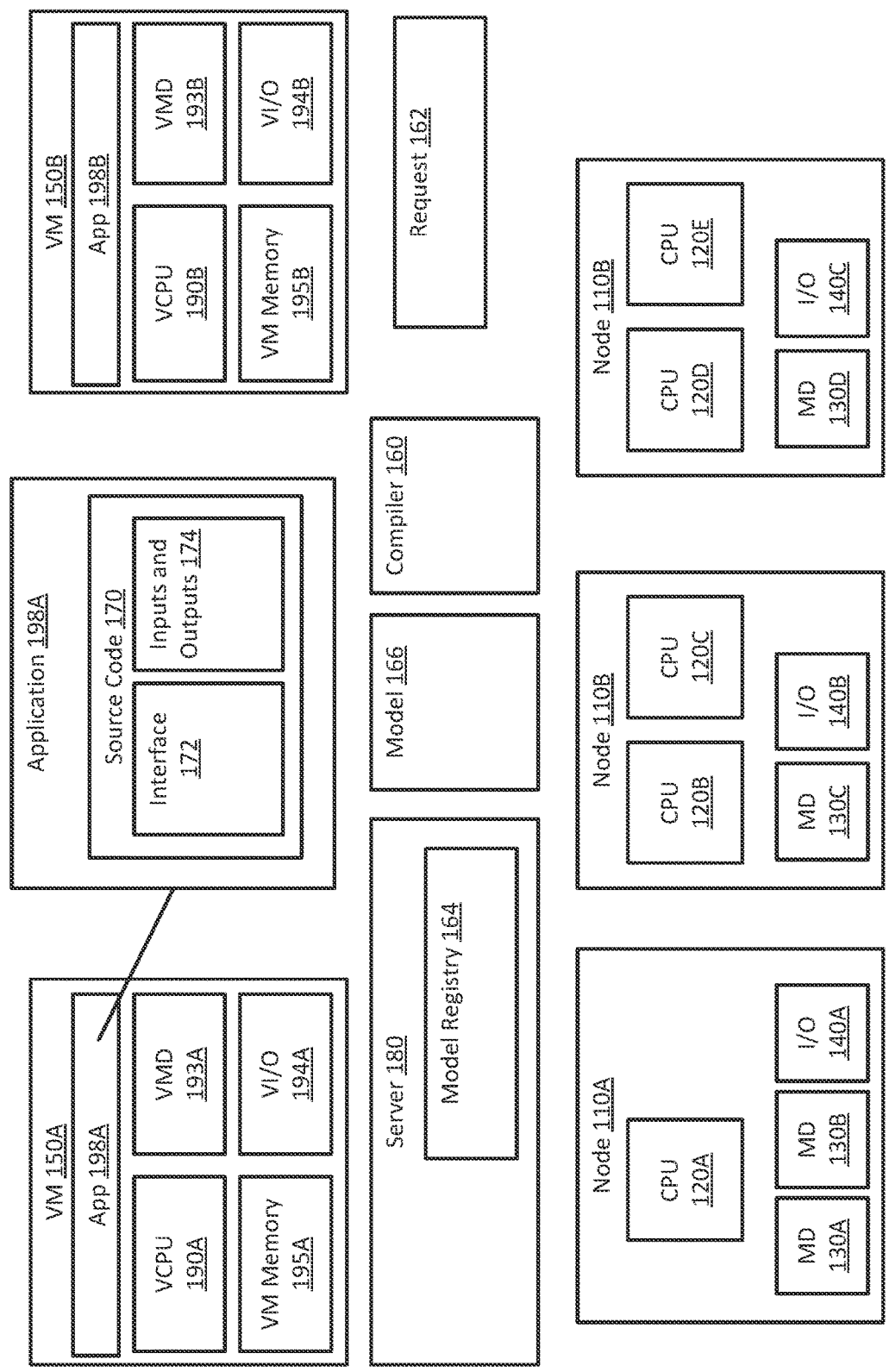
FIG. 1 illustrates a high level component diagram of an example computing system in accordance with one or more aspects of the present disclosure.

FIG. 1 depicts a high-level component diagram of an example computing system 100 in accordance with one or more aspects of the present disclosure. The computing system 100 may include a server 180, a model 166, a compiler 160, one or more virtual machines (VM 150A-B, 150 generally), and nodes (e.g., nodes 110A-C, 110 generally). The server 180 may include a model registry 164, which may store models (e.g., model 166). Compiler 160 may receive a request (e.g., request 162) to build an application (e.g., application 198A) based on an associated source code (e.g., source code 170). Compiler 160 may analyze the source code to detect whether an interface (e.g., interface 172) is implemented within the application (e.g., application 198A). The compiler 160 may parse the source code to determine an invocation of the interface and determine, based on the invocation, inputs and outputs (I/Os) (e.g., inputs and outputs 174). In various implementations, a compiler 160 may generate a model (e.g., 166) based on I/Os (e.g., I/Os 174) from the interface (e.g., interface 172) and publish the model to a registry (e.g., model register 164). In certain implementations, an application (e.g., application 198B) attempting to receive messages from another interface (e.g., interface 172) of another application (e.g., application 198) may retrieve a model (e.g., model 166) from model registry 164 to interpret messages from the application (e.g., 198A).

Virtual machines 150A-B may include a virtual machine memory (VM Memory), a virtual CPU (VCPU), virtual memory devices (VMD), and virtual input/output devices (VI/O). For example, virtual machine 150A may include virtual machine memory 195A, a virtual CPU 190A, a virtual memory devices 193A, and a virtual input/output device 194A. Similarly, virtual machine 150B may include virtual machine memory 195B, a virtual CPU 190B, a virtual memory devices 193B, and virtual input/output device 194B. In an example, Applications 198A-B may be different applications or services. In another example, applications 198A-B may be different instances of the same application or service.

In an example, a virtual machine 150A may execute a guest operating system and run applications 198A-B which may utilize the underlying VCPU 190A, VMD 193A, and VI/O device 194A. One or more applications 198A-B may be running on a virtual machine 150A under the respective guest operating system. A virtual machine (e.g., VM 150A-B, as illustrated in FIG. 1) may run on any type of dependent, independent, compatible, and/or incompatible applications on the underlying hardware and operating system ("OS"). In an example, applications (e.g., App 198A-B) run on a virtual machine 150A may be dependent on the underlying hardware and/or OS. In another example embodiment, applications 198A-B run on a virtual machine 150A may be independent of the underlying hardware and/or OS. For example, application 198A run on a first virtual machine 150A may be dependent on the underlying hardware and/or OS while application (e.g., application 198B) run on a second virtual machine (e.g., VM 150B) is independent of the underlying hardware and/or OS. Additionally, applications 198A-B run on a virtual machine 150A may be compatible with the underlying hardware and/or OS. In an example embodiment, applications 198A-B run on a virtual machine 150A may be incompatible with the underlying hardware and/or OS. For example, application 198A run on one virtual machine 150A may be compatible with the underlying hardware and/or OS while applications 198B run on another virtual machine 150B are incompatible with the underlying hardware and/or OS.

In an example, virtual machines 150A-B may instead be containers that execute applications or services, such as microservices. In an example, the containers may each run a process or service and the containers may be any execution environment. For example, the containers may be a virtual server. It should be appreciated that containers may be stand alone execution environments, similar to that of a virtual machine. The applications 198A-B or services (e.g., microservices) may run in a software container or a virtual machine (e.g., virtual machines 150A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 150A-B may be provisioned on the same host or node (e.g., node 110A) or different nodes. For example, VM 150A and VM 150B may both be provisioned on node 110A. Alternatively, VM 150A may be provided on node 110A while VM 150B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
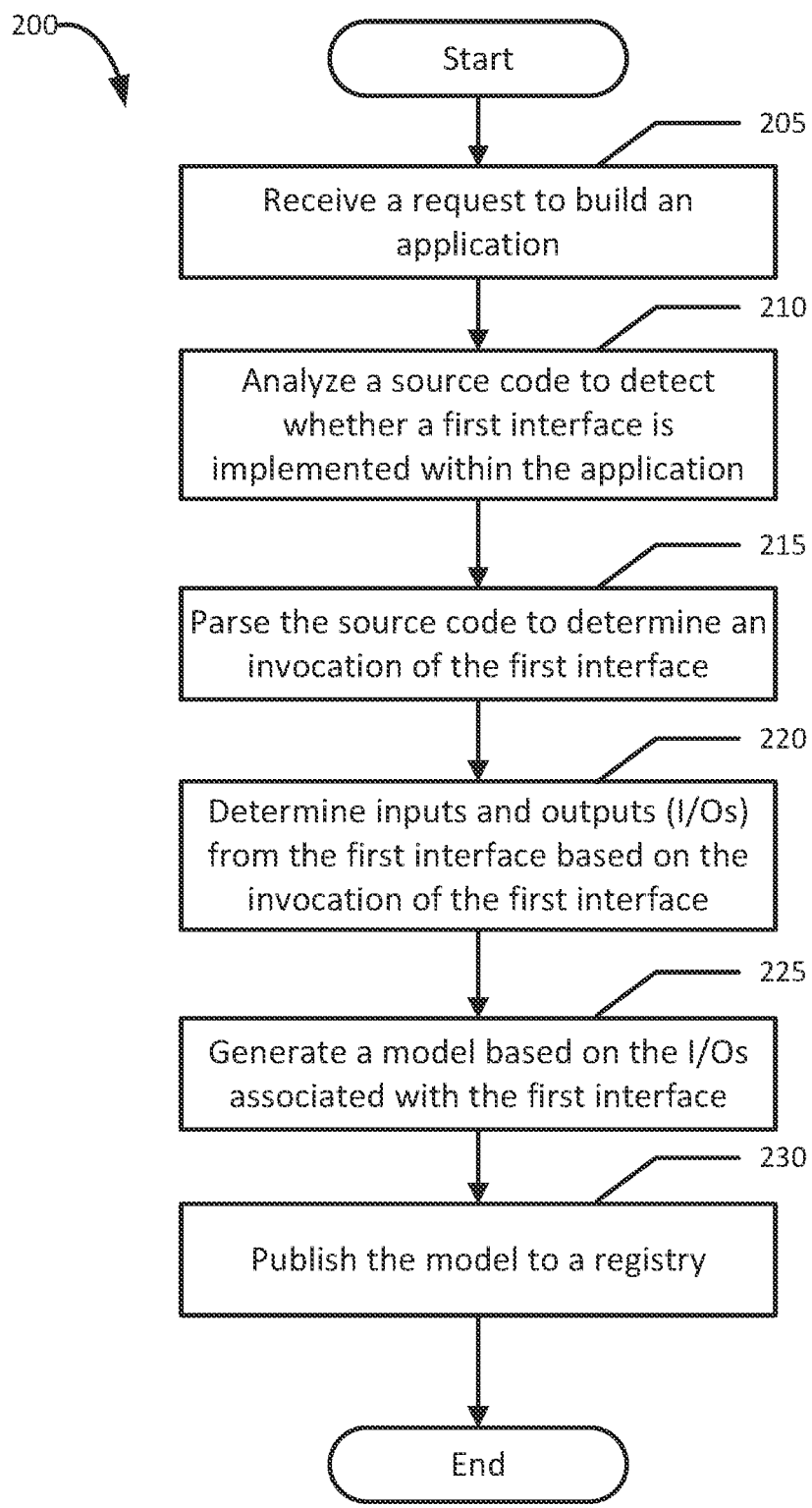
FIG. 2 illustrates a flowchart of an example method of generating a model for communicating with other applications in accordance with one or more aspects of the present disclosure.

FIG. 2 illustrates a flowchart of an example method of generating a model for communicating other applications, in accordance with an embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated and some of the blocks described are optional. The method 200 may be performed by processing logic that may comprise hardware (circuitry, dedicated logic, etc.), software, or a combination of both.

As shown in FIG. 2, an example method 200 may begin with receiving a request to build an application (block 205). In this instance, the application is associated with source code. In an implementation, compiler 160 may receive request 162 to build application 198A based on source code 170. For example, a compiler (e.g., compiler 160) may be tasked with building an application (e.g., application 198A) with a Kafka interface (e.g., interface 172) operable to stream data (e.g., streaming video, banking information, stock information) to other applications (e.g., application 198B executing on virtual machine 150B). Next, the example method 200 may include analyzing a source code to detect whether a first interface is implemented within the application (block 210). In an implementation, compiler 160 may analyze source code 170 to detect whether interface 172 is implemented within application 198A. For example, in one instance, a compiler (e.g., compiler 160) may be able to analyze source code (e.g., source code 170) to detect whether the source code includes functions (e.g., reader and/or writer functions) associated with a specific interface (e.g., a Kafka interface capable of streaming data). In various implementations, a model may also be referred to as a schema.

Next, the example method 200 may include parsing the source code to determine an invocation of the first interface (block 215). In an implementation, compiler 160 may parse the source code 170 to determine an invocation of the interface 172. Next, the example method 200 may include determining inputs and outputs (I/Os) from the first interface based on the invocation of the first interface (block 220). In an implementation, the compiler 160 may determine inputs and outputs (I/Os) 174 from the interface 172 based on the invocation of the interface 172. For example, a compiler may be able to determine what structures and sent and/or received analyzing one or more function calls within an application (e.g., application 198A). Next, the example method 200 includes generating a model based on the I/Os associated with the first interface (block 225). In an implementation, compiler 160 may generate model 166 based on the I/Os 174 associated with the interface 172. Next, the example method 200 includes publishing the model to a registry (block 230). In an implementation, compiler 160 may publish the model 166 to the model registry 164 on the server 180. In various implementations, a model may be written in various formats (e.g., Avro schema, Protobuf schema, or JavaScript Object Notation (JSON)).

Figure 3:
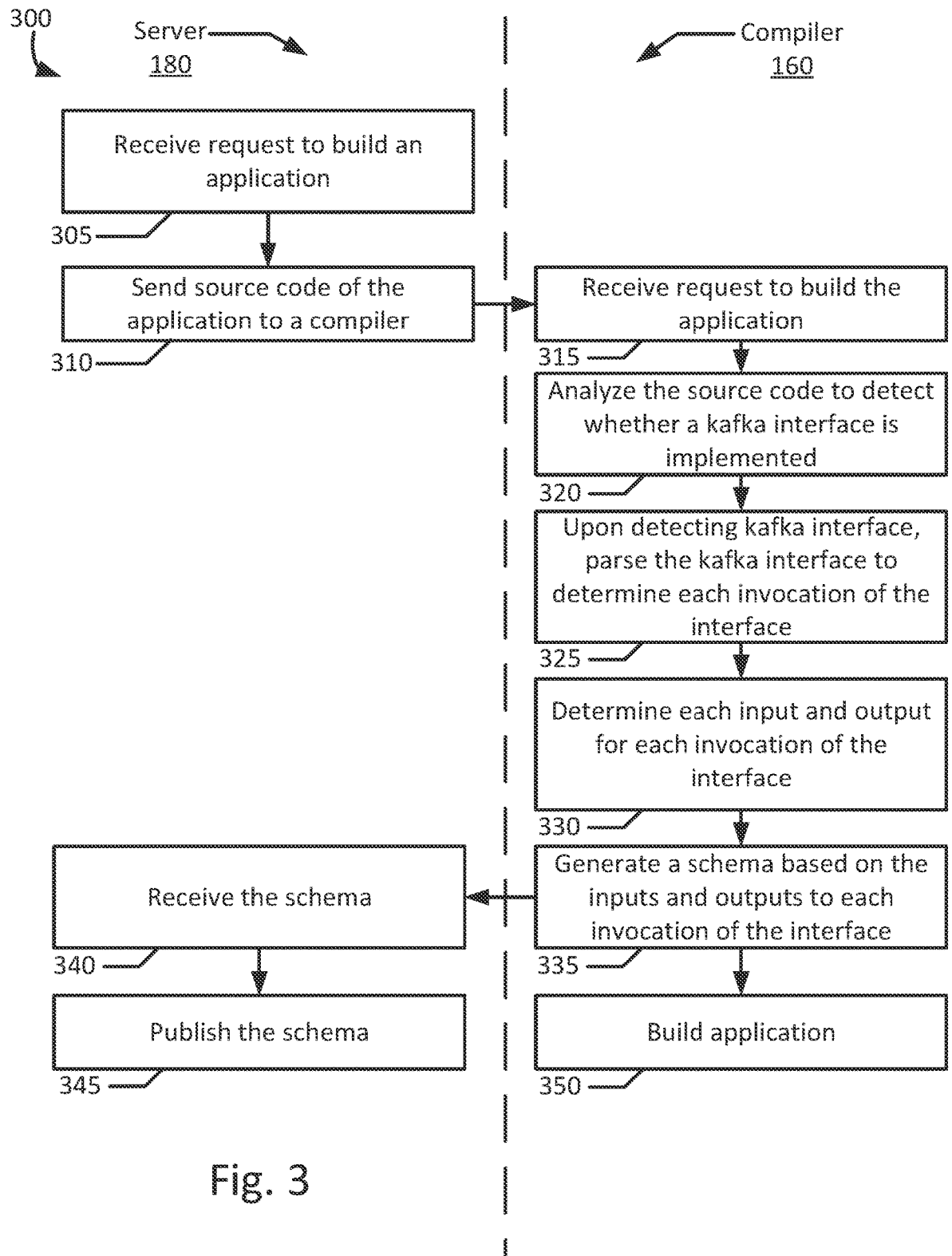
FIG. 3 illustrates a flow diagram of an example method of building an application according to an example embodiment of the present disclosure.

FIG. 3 illustrates a flow diagram of an example methods of building an application, in accordance with an embodiment of the present disclosure. Although the example method 300 is described with reference to the flow diagram illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. For example, in the illustrated flow diagram, a server 180 is in communication with a compiler 160 to build an application 198A.

As shown in FIG. 3, Server 180 receives a request 162 to build application 198A (block 305). Server 180 sends the source code 170 of the application 198A to a compiler 160 (block 310). The compiler 160 receives the request 172 to build the application 198A (block 315). Next, the compiler 160 analyzes the source code 170 to detect whether a Kafka interface 172 is implemented (block 320). For example, a compiler may check for a presence of specific classes (e.g., Kafka libraries) in the source code. In some instances, a compiler may detect a presence of specific input parameters associated with a specific interface (e.g., a kafka interface). Upon detecting the Kafka interface 172, the compiler 160 parses the Kafka interface 172 to determine each invocation of the interface 172 (block 325). Next, the compiler 160 determines each input and output 174 for each invocation of the interface 172 (block 330) and generates a schema (e.g., model 166) based on the inputs and outputs 174 to each invocation of the interface 172 (block 335). The server 180 receives the schema (e.g., model 166) (block 340) and publishes the schema (e.g., model 166) (block 345). Subsequently, the compiler builds the application 198A form the source code 170 (block 350).

Figure 4:
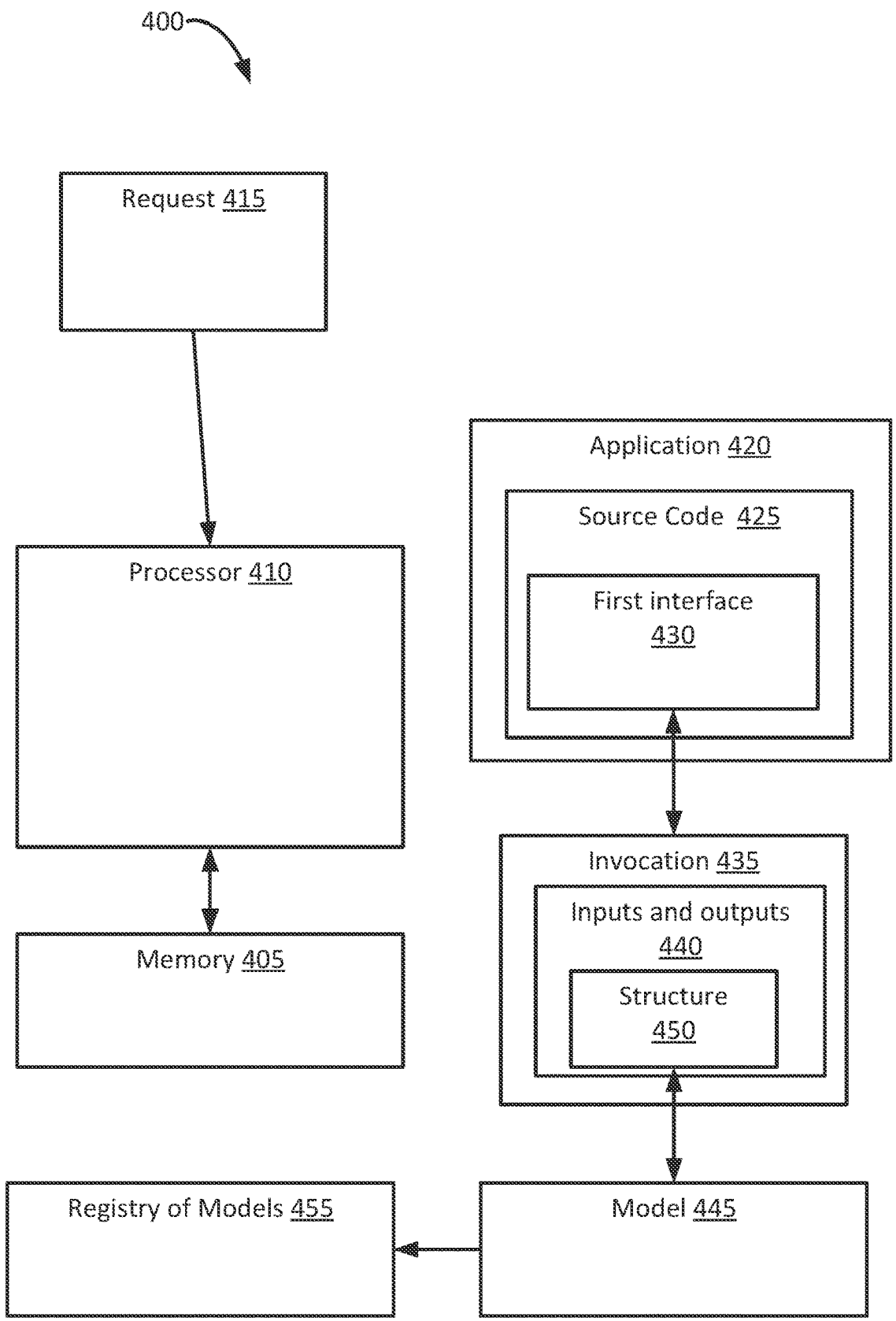
FIG. 4 illustrates a block diagram of an example system generating a model for communicating with other applications according to an example embodiment of the present disclosure.

FIG. 4 is a block diagram of system 400 which includes memory 405 and processor 410. The processor 410 is in communication with the memory 405. The processor 410 is configured to receive a request 415 to build an application 420, where the application 420 is associated with the source code 425. The source code 425 is analyzed to detect whether a first interface 430 is implemented within the application 420. The source code 420 is parsed to determine an invocation 435 of the first interface 430. Inputs and outputs (I/Os) 440 are determined from the first interface 430 based on the invocation 435 of the first interface. A model 445 is generated based on the I/Os 440 associated with the first interface 430, where the model 445 includes a structure 450 of each of the I/Os 440. The model 445 is then published to a registry of models 455.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:
1. A system, comprising:
a memory; and
a processor in communication with the memory, wherein the processor is configured to:

receive a request to build an application that is operable to stream data to other applications, wherein the application is associated with source code;
analyze the source code to detect whether a first interface is implemented within the application;
parse the source code to determine an invocation of the first interface;
determine inputs and outputs (I/Os) from the first interface based on the invocation of the first interface;
generate a model based on the I/Os associated with the first interface, wherein the model includes a structure of each of the I/Os; and
publish the model to a registry,
wherein analyzing the source code comprises:
parsing the source code to determine whether a library is included in the application; and
determining whether the library is associated with the first interface.

2. The system of claim 1, wherein the first interface is a streaming interface.

3. The system of claim 2, wherein the streaming interface is a Kafka interface.

4. The system of claim 1, wherein the model is a schema.

5. The system of claim 1, wherein the model is written in JavaScript Object Notation (JSON).

6. The system of claim 1, wherein the model is written in Avro schema.

7. The system of claim 1, wherein the model is written in Protobuf schema.

8. The system of claim 1, wherein the processor is further configured to build the application.

9. A method, comprising:
receiving a request to build an application that is operable to stream data to other applications, wherein the application is associated with source code;
analyzing the source code to detect whether a first interface is implemented within the application;
parsing the source code to determine an invocation of the first interface;
determining inputs and outputs (I/Os) from the first interface based on the invocation of the first interface;
generating a model based on the I/Os associated with the first interface, wherein the model includes a structure of each of the I/Os; and
publishing the model to a registry,
wherein analyzing the source code comprises:
parsing the source code to determine whether a library is included in the application; and
determining whether the library is associated with the first interface.

10. The method of claim 9, wherein the first interface is a streaming interface.

11. The method of claim 10, wherein the streaming interface is a Kafka interface.

12. The method of claim 9, wherein the model is a schema.

13. The method of claim 9, wherein the model is written in JavaScript Object Notation (JSON).

14. The method of claim 9, wherein the model is written in Avro schema.

15. The method of claim 9, wherein the model is written in Protobuf schema.

16. The method of claim 9, wherein the processor is further configured to build the application.

17. A non-transitory machine readable medium storing code, which when executed by a processor is configured to:
receive a request to build an application that is operable to stream data to other applications, wherein the application is associated with source code;
analyze the source code to detect whether a first interface is implemented within the application;
parse the source code to determine an invocation of the first interface;
determine inputs and outputs (I/Os) from the first interface based on the invocation of the first interface;
generate a model based on the I/Os associated with the first interface, wherein the model includes a structure of each of the I/Os; and
publish the model to a registry,
wherein analyzing the source code comprises:
parsing the source code to determine whether a library is included in the application; and
determining whether the library is associated with the first interface.

* * * * *